(12) United States Patent
Klooster, Van Der

(10) Patent No.: US 11,007,703 B2
(45) Date of Patent: May 18, 2021

(54) TAPE APPLICATION DEVICE FOR HELICAL APPLICATION OF A TAPE ON A TUBE

(71) Applicant: Compovation Pipeline B.V., Maren-Kessel (NL)

(72) Inventor: Jos Klooster, Van Der, Maren-Kessel (NL)

(73) Assignee: Compovation Pipeline B.V., Maren-Kessel (NL)

(*) Notice: Subject to any disclaimer, the term of this patent is extended or adjusted under 35 U.S.C. 154(b) by 0 days.

(21) Appl. No.: 16/631,711

(22) PCT Filed: Jul. 16, 2018

(86) PCT No.: PCT/NL2018/050491
§ 371 (c)(1),
(2) Date: Jan. 16, 2020

(87) PCT Pub. No.: WO2019/017777
PCT Pub. Date: Jan. 24, 2019

(65) Prior Publication Data
US 2020/0164568 A1  May 28, 2020

(30) Foreign Application Priority Data
Jul. 19, 2017 (NL) ................................ 2019282

(51) Int. Cl.
*B29C 63/10* (2006.01)
*B29C 63/00* (2006.01)
(Continued)

(52) U.S. Cl.
CPC ........ *B29C 63/105* (2013.01); *B29C 63/0004* (2013.01); *B29K 2101/12* (2013.01); *B29K 2105/06* (2013.01); *B29L 2023/22* (2013.01)

(58) Field of Classification Search
CPC .............. B29C 63/105; B29C 63/0004; B29K 2101/12; B29K 2105/06; B29L 2023/22
See application file for complete search history.

(56) References Cited

U.S. PATENT DOCUMENTS 2,011,172 A   8/1935 Coleman et al.
3,099,190 A * 7/1963 Allen, Jr. .............. B29C 63/105
                                                    493/299
(Continued)

FOREIGN PATENT DOCUMENTS

DE            1255296 B     11/1967

*Primary Examiner* — Jeffry H Aftergut
(74) *Attorney, Agent, or Firm* — Elmore Patent Law Group, P.C.; Joseph Zucchero; Carolyn Elmore

(57) ABSTRACT

A tape application device (1) comprises a tube holder (9), a roll retainer (11), guide means (35) for guiding a tape (3) from the inside (7a) of a roll (7) to the outside of a tube (5) and displacement means for rotating around an imaginary axis and translating in the direction of the imaginary axis the tube holder, roll retainer and guide means relative to each other, such that the tape is pulled out of the roll on the inside and is helically wound on the outside of the tube. The roll retainer (11) has support means (26) which support the roll only on the outside, which support means are formed by suction cups (27). The guide means (35) are formed by a resilient helical tape guide (37) which, during operation, resiliently pushes with one end (37a) against the inside (7a) of the roll (7) and with the other end (7b) is present close to the tube (5).

12 Claims, 4 Drawing Sheets

(51) Int. Cl.
  *B29K 101/12* (2006.01)
  *B29K 105/06* (2006.01)
  *B29L 23/00* (2006.01)

(56) References Cited

U.S. PATENT DOCUMENTS 3,296,784 A     1/1967  Guiton
2003/0121595 A1* 7/2003 Dixon-Roche ......... F16L 11/24
                                              156/195

* cited by examiner

TAPE APPLICATION DEVICE FOR HELICAL APPLICATION OF A TAPE ON A TUBE

TECHNICAL FIELD OF THE INVENTION

The invention relates to a tape application device for helical application of a tape from a roll of superimposed tape windings on a tube, comprising a tube holder, a roll retainer and displacement means for rotating around an imaginary axis and translating in the direction of the imaginary axis the tube holder and roll retainer relative to each other such that the tape is taken from the inside of the roll and is helically wound on the outside of the tube.

BACKGROUND OF THE INVENTION

Such a tape application device is known from U.S. Pat. No. 3,296,784A. In this known tape application device a tape originating from a feed reel is wound on the outside of a tape roll and the tape on the inside of the tape roll is led by a tape guide to a tube and rotated around the tube while simultaneously the tape application device and the tube are moved relative to each other in longitudinal direction of the tube. The tape roll is then wound on a plurality of supporting rolls which are present on a ring and are movable in radial direction. This ring accommodating the diverting rolls present thereon is rotated around the tube during the relative translation together with the diverting rolls also fastened to the ring. When the tape is unwound on the inside, the inside diameter of the roll increases and the supporting rolls move outwards. If the tape has almost completely left the roll, the free end of the roll is retained temporarily stationary and the end of a new storage reel is joined to this end while the support rolls move inwards. Subsequently, during the unwinding of the roll on the inside, while the supporting rolls rotate relative to the roll, the tape coming from the feed reel is wound on the outside, the winding operation being more than 3 times faster than the unwinding operation. In this known device, the tape is wound on the tube, and in the event of a non-rotating tube, the ring with support rolls is to be rotated once around the tube for winding the tape on the tube once, where the roll is to co-rotate with the ring at a lower speed because otherwise too long a part of the tape is wound from the roll. Owing to the movable support rolls, the known tape application device has a complex construction and the speed at which the tape can be unwound from the roll and wound on the tube can be restricted.

SUMMARY OF THE INVENTION

It is an object of the invention to provide a tape application device of the type described in the preamble which is simpler than the known tape application device and wherein the tape can be taken from the (inside of the) roll at a greater speed and can be wound on the tube than with the known tape application device. To this end, the tape application device according to the invention is characterized in that the roll retainer only comprises support means which support the roll only on the outside. The support means preferably comprise suction cups. The support means thus form the only support means of the tape application device that are intended to support a roll during the application operation. The inside of the roll is not supported by support rolls or otherwise but is completely free. Thanks to the lack of support rolls on the inside of the roll, a simple construction is obtained. By supporting the roll only on the outside (retaining it) the tape can be pulled out of the roll instead of being unwound from the roll. Pulling the tape from the roll may be effected at higher speeds than unwinding. Moreover, the tape does not experience any resistance during the pulling of the tape out of the roll.

Due to the relative rotating and translating movements of the tube and the roll, the tape is pulled from the inside of the roll and helically wound around the tube, so that the tape need not be guided between the inside of the roll and the outside of the tube. However, for the tape-pulling operation from the roll and application on the tube to run better, the tape application device according to the invention preferably includes guide means for guiding the tape from the inside of the roll to the outside of the tube. Depending on the difference in diameter of the inside diameter of the roll and the outside diameter of the tube and depending on the pitch of the tape to be helically wound on the tube, the roll must be rotated clockwise or anti-clockwise while the tape is being wound on the tube so as to obtain the desired helical shape. Since the inside diameter of the roll increases during operation, the rotational speed of the roll during operation is to be adjusted continuously. To this end, the tape application device is to be provided with control means. Appropriate generally known control means may be used for this purpose.

These guide means preferably comprise a resilient helical tape guide which, during operation, resiliently pushes with one end present on the largest diameter of the helical shape against the inside of the roll and with the other end is present close to the tube during operation. The tape guide is connected close to this other end to the displacement means which in this embodiment not only rotate and translate the roll and the tube relative to each other, but translate and rotate both the roll retainer and tube holder and the guide means relative to each other.

The tape guide is preferably helical, where the spiral extends in a plane. The spiral may also be three-dimensional (helical) with a continuously increasing (or decreasing, depending on which direction is looked in) diameter (or a two-dimensional spiral pulled apart in axial direction), so that the tape can be guided better to the tube. This is partly dependent on the properties of the tape.

The displacement means are preferably such that they translate the tube holder in axial direction relative to the roll retainer and the guide means and furthermore the displacement means are preferably such that they rotate the roll retainer and the guide means in the same direction at different speeds.

An embodiment of the tape application device according to the invention is characterized in that the tape application device further includes a fastening unit for fastening the tape to the tube, which fastening unit comprises a diverting roller which is parallel to and spaced apart from the tube and the tape of the tube and guides the tape back to the tube again, which fastening unit furthermore includes fasteners which are present between the tube and the diverting roller and between the tape parts located between the tube and the diverting roller and from there back to the tube, and which process the tube-oriented tape side, and which fasteners comprise rotation means for rotating the diverting roller together with the heating means around the tube. In the fastening unit the tape is caused to leave the tube and be processed on the side with which it is stuck to the tube again (for example provided with an adhesive layer) and then wound around the tube again.

It should be noted that the fasteners cannot only be used with the fastening unit described above, but may also be used in any other tape application device where the tape is arranged helically on the tube, as in the known tape application device, for example.

Preferably the fasteners are designed as heating means which soften or melt the tape on the inside so that it sticks to the tube. The fastening unit preferably further includes a pressure roller for pressing the tape against the tube after heating, which pressure roller together with the diverting roller and the heating means rotates around the tube. The fastening of the tape to the tube is preferably effected in a vacuum chamber in which the diverting roller and fasteners are present. Since the fastening does not take place as usual during the conveyance of the tape from the roll to the tube, but after the tape has been wound on the tube, the fastening can be carried out in a relatively small vacuum chamber, whereas otherwise the entire roll is to be present in a much larger vacuum chamber.

For application in addition to said tape a further tape on the tube and/or on top of the tape already present with the same or different pitch (for example application in the opposite direction), a further embodiment of the tape application device according to the invention is provided with a further roll retainer as well as further displacement means for rotating around an imaginary axis and translating in the direction of the imaginary axis the tube holder and further roll retainer relative to each other such that a further tape is taken from the inside of the further roll and is helically applied to the outside of the tube and/or on top of the tape already wound on the tube, and in that the fastening unit comprises a further diverting roller which is parallel to and spaced apart from the tube and guides the further tape from the tube and leads it back to the tube again, as well as further fasteners which are present between the tube and the further diverting roller, where the rotation means rotate the further diverting roller together with the further fasteners around the tube.

Another embodiment of the tape application device according to the invention is characterized in that the tape application device further includes a winding unit which comprises a spreading mandrel on which the tape originating from a feed reel can be rolled up and which comprises winding means for rotating the spreading mandrel. As the tape is wound from a roll, a next tape is wound into a new roll. As soon as one roll is nearly empty, the tape wound on the spreading mandrel is moved to the support means and the inner end of the new roll is attached to the outer end of the old roll which is nearly empty and placed into the roll retainer. The spreading mandrel is then contracted and moved back so that a new roll can be wound on the spreading mandrel.

The tape may be rigid, where, when wound into a roll on which the tape is curved elastically, it presses against the winding present on a larger diameter. In this case it is sufficient to only hold the outer winding. Preferably, however, the winding unit further includes spot welding means for mutually connecting the tape windings, so that a more form-retaining roll is obtained, and even softer tapes may be used. During the winding of the tape on the tube, it is pulled on the inside of the roll and the weak spot welds will break.

BRIEF DESCRIPTION OF THE DRAWINGS

The invention will be explained in more detail hereinbelow shown in the drawings with reference to an example of embodiment of the tape application device according to the invention; in which:

FIG. 6 shows the winding unit of the tape application device shown in

FIG. 1; and

DETAILED DESCRIPTION OF THE DRAWINGS

Figure 1:
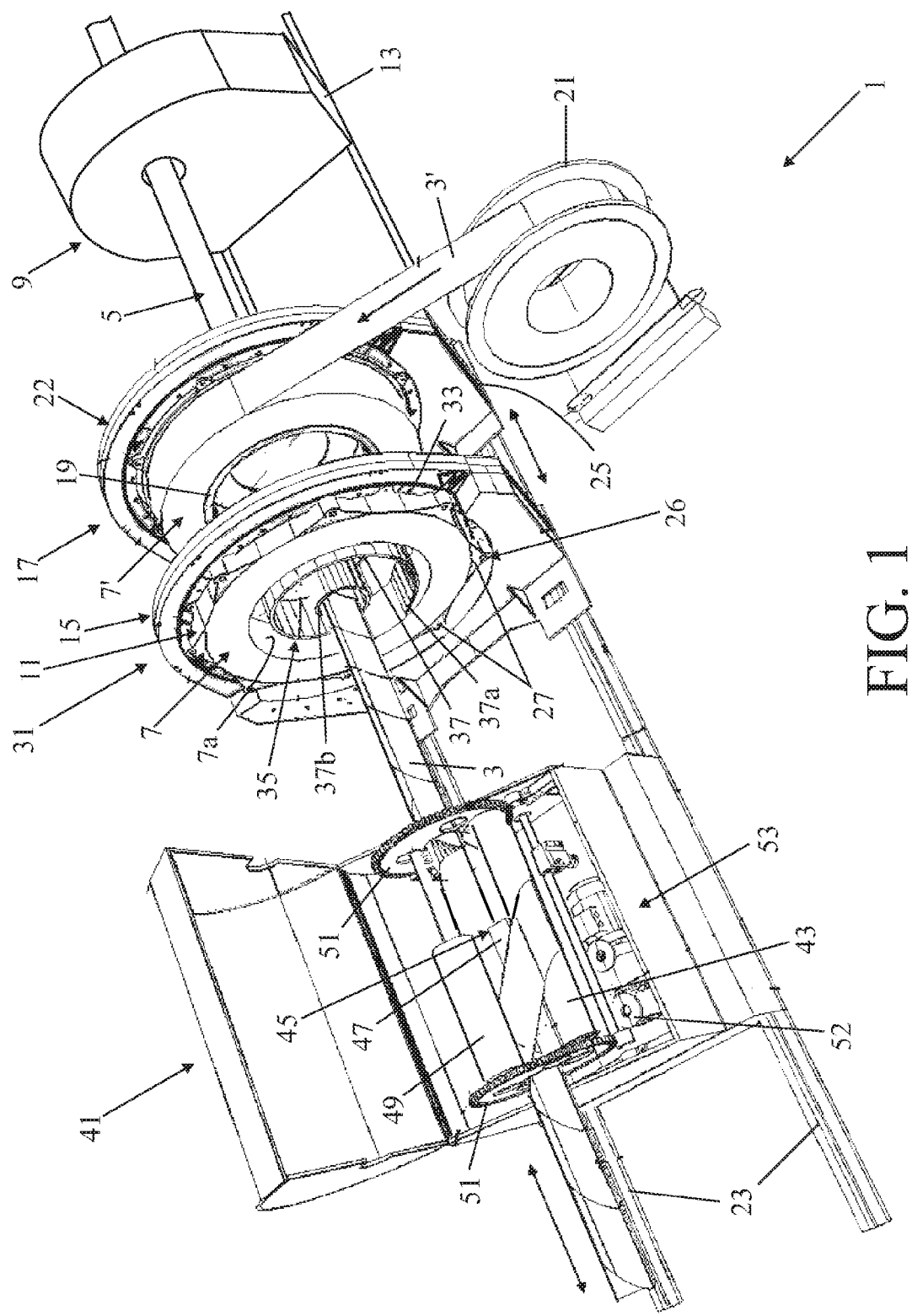
FIG. 1 shows the tape application device in a perspective view during operation with a tape guide curved along a two-dimensional spiral.

FIG. 1 shows in a perspective view an embodiment of the tape application device 1 according to the invention for helically application a tape 3, 3' on a tube 5 during operation. The tape is, for example, a bonded thermoplastic composite which is wound into a centerless roll 7, 7'. The tape application device has a tube holder 9 for holding the tube and a roll retainer 11 which retains the roll during the application operation. The tape application device further has displacement means for rotating and translating the tube holder and roll retainer relative to each other. These displacement means are formed by translation means 13 which can displace the tube holder in a direction parallel to the axis of the tube and rotation means 15 which can rotate the roll retainer about the axis of the tube. By rotating the roll 7 and displacing the tube 5, the tape 3 is taken from the inside 7a of the roll and helically wound on the outside of the tube.

Figure 4:
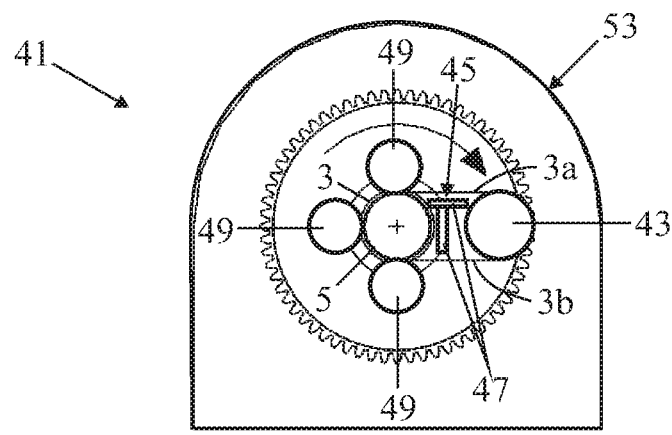
FIG. 4 shows the fastening unit of the tape application device shown in FIG. 1 in a cross-sectional view.
Figure 6:
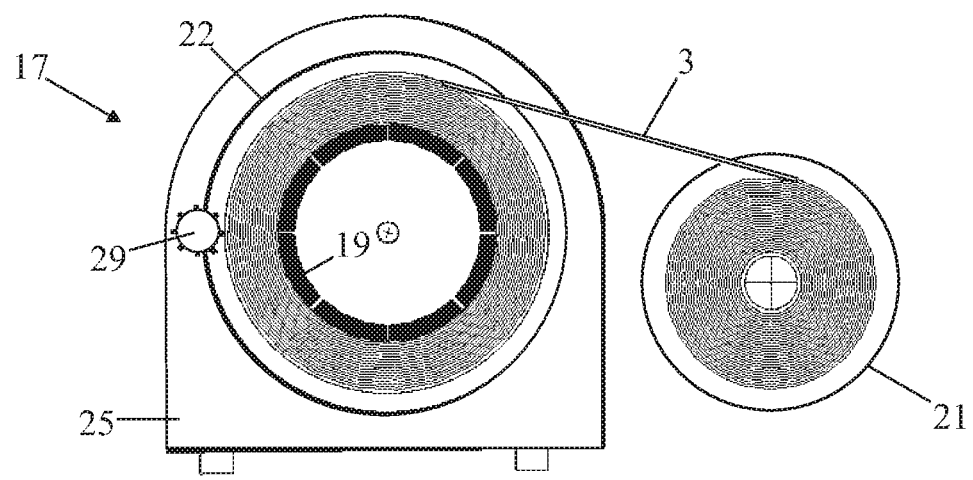

The tape 3' is made into a centerless roll 7' in a winding unit 17. In FIG. 4 this winding unit is shown separately. This winding unit has a spreading mandrel 19 on which the tape 3' is wound which originates from a feed reel 21. The tape is, for example, a Fiber Reinforced Thermoplastics tape (FRT tape). To this end, the winding unit is provided with winding means 22 for rotating the spreading mandrel. The winding unit is present on a guiding element 23, see FIG. 1, and can be displaced towards and from the roll retainer 11 by further displacement means 25. In the roll retainer the roll 7 is supported only on the outside by support means 26. These support means are formed by suction cups 27 which retain the roll on the outside. Arriving at the roll retainer 11 the diameter of the spreading mandrel 19 is reduced, after which the winding unit 17 is moved back. For mutually connecting the tape windings, the winding unit is provided with spot welding means 29, see FIG. 6, which locally weld the newly wound tape 3' on the underlying winding by means of weak spot welds which are easy to break.

The helical arrangement of the tape on the tube is effected by a tape feed unit 31, see FIG. 1, which, in addition to the suction cups 27 for retaining the roll 7 and the rotation means 15 for rotating a ring 33 on which the suction cups 27 are present, furthermore includes guide means 35 for guiding the tape from the inside 7a of the roll to the outside of the tube 5. These guide means are formed by a resilient spiral tape guide 37 which is curved along a two-dimensional spiral. During operation, the tape guide having a resilient end 37a is fitted to the inside 7a of the roll 7. The other end 37b of the tape guide is present close to the tube 5. The tape guide 37 is connected to further rotation means (present within the rotation means 15 and therefore not visible in FIG. 1) which form part of said displacement means.

During the application operation the displacement means rotate and translate the roll retainer, the tube holder and the guide means relative to each other. The roll retainer 11 and the tape guide 37 are then rotated in the same direction but at different speeds. The helical pitch with which the tape 3 is arranged on the tube 5 may be varied by changing the speeds of the translation of the tube 5 and the rotation of the roll 7. For example, there may be opted for applying the tape with a pitch twice the width of the tape, after which a further tape application device in similar manner winds a further tape on the tube in the gap between the tape windings already present. Further down the line, two further tape application devices may be installed to wind two further tapes in opposite directions over the tapes already present. This may be expanded at will. For example, the application of the tapes on a tube may take place directly after the extrusion of the tube. With the tape application device according to the invention the application of the tape may be performed at high speed so that the extrusion process may be kept up with. This is not possible with the known tape application device.

Figure 2:
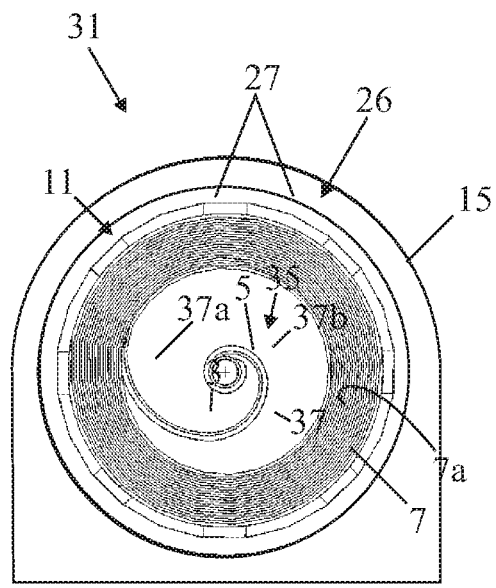
FIG. 2 shows the tape feed unit of the tape application device shown in FIG. 1 during the installation of a new, full roll.
Figure 3:
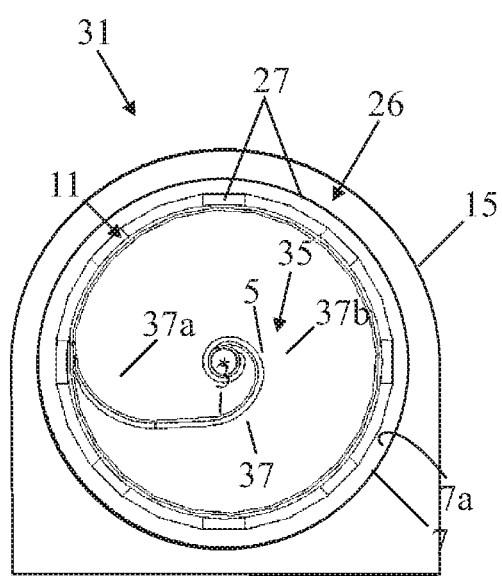
FIG. 3 shows the tape feed unit shown in FIG. 2 with an almost unwound roll.

In the tape feed unit 31, the tape is fed to the tube 5 by the spiral tape guide 37 and is fastened to the tube a single time. The linear movement of the tube draws the tape out of the center of the rotating spiral tape guide and thereby forms a helix. The flexible tape guide 37 is continuously resiliently in contact with the tape on the inside 7a of the roll and scrapes over the inside and thereby breaks the spot welds. As the inner diameter of the roll increases, so does the outer diameter of the spiral guide. This is illustrated with reference to FIGS. 2 and 3, where in FIG. 2 the tape feed unit is shown during the application of a new, full roll 7 and in FIG. 3 the tape feed unit is shown with an almost unwound roll.

For fastening the tape 3 helically wound on the tube 5, the tape application device has a fastening unit 41. FIG. 4 shows the fastening unit of the tape application device in a cross-sectional view. The fastening unit has a diverting roller 43 which is parallel to and remote from the tube. The diverting roller guides the tape away from the tube and back to the tube again. Between the tube and the diverting roller and between the tape parts 3a and 3b extending from the tube to the diverting roller and from there back to the tube again, fasteners 45 are present. These fasteners are formed by heating means 47 (IR heater) and heat the side of the tape facing the tube so that this tape becomes sticky (up to the melting temperature). Subsequently, the tape is stuck to the tube, with pressure rollers 49 providing the necessary pressure force. The fasteners 45 are rotated around the tube 5 together with the diverting roller 43 and the pressure rollers 49. For this purpose they are connected to toothed wheels 51 which are rotated by rotating means 52. The fasteners 45 with diverting roller 43 and pressure rollers 49 and the toothed wheels 51 are located in a vacuum chamber 53 to prevent air and dirt inclusions between the tape and the tube from occurring during heating and pressing.

Figure 5:
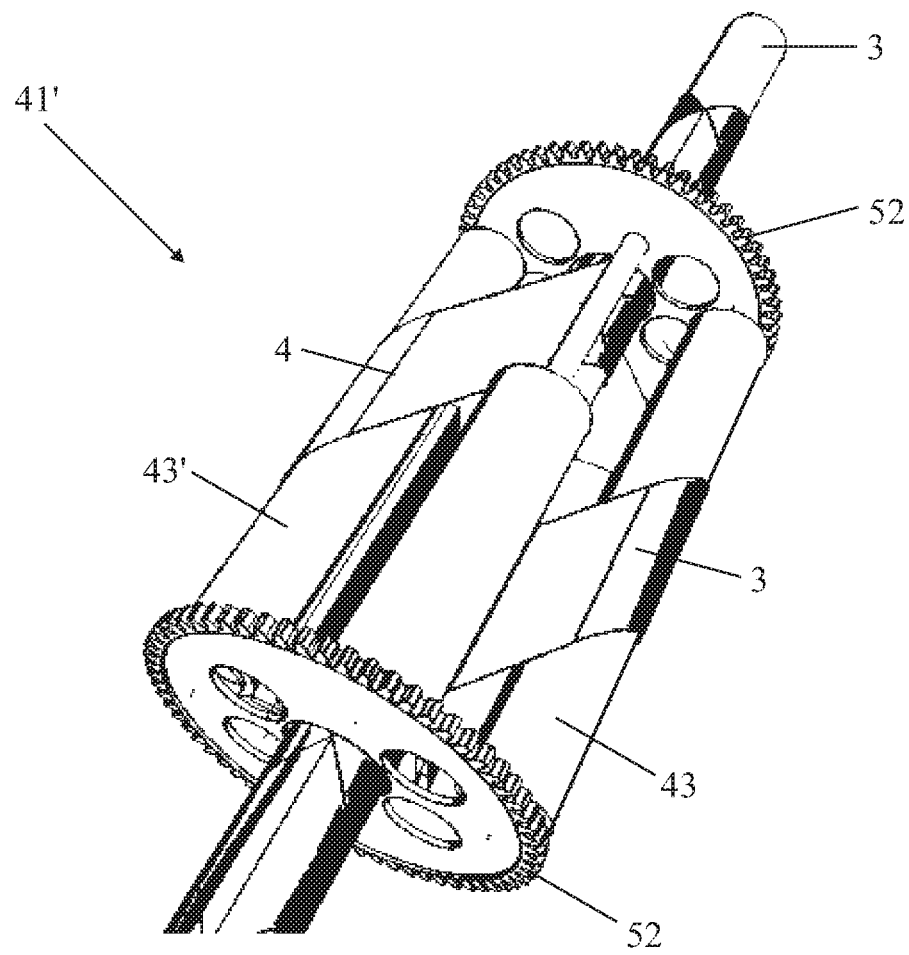
FIG. 5 shows another embodiment of the fastening unit with which more than one tape can be wound on the tube.

For application a further tape on the tube and/or tape already wound on the tube in addition to the aforementioned tape, the tape application device may be provided with a further roll retainer, as well as further displacement means for rotating about an imaginary axis and translating in the direction of the imaginary axis the tube holder and further roll retainer relative to each other, such that a further tape is taken from the inside of the further roll and is wound helically on the outside of the tube and/or on the tape already present on the tube. In that case, the tape application device may furthermore be provided with a further fastening unit. However, alternatively it is possible to use a fastening unit that can fasten both the tape 3 and the further tape 4 to the tube 5. The interior of such a fastening unit is shown in FIG. 5. This fastening unit 41' has, in addition to the diverting roller 43, a further diverting roller 43' which is parallel to and spaced apart from the tube and which guides the further tape 4 from the tube 5 and back to the tube again. The fastening unit 41' furthermore has further fasteners (not shown in the figure and, for example, again embodied as heating means) which are located between the tube 5 and the further diverting roller 43'. The rotation means 52 also rotate the further diverting roller 43' together with the further fasteners around the tube 5.

The tube 5 is linearly conveyed through the center of the winding unit 17, the tape feed unit 31 and the fastening unit 41 during the winding operation. By installing winding units alternately and one behind the other, a production line is created which can provide a tube with several layers of the tape where two successive layers are wound in opposite directions.

Although in the foregoing the invention has been explained with reference to the drawings, it should be noted that the invention is by no means limited to the embodiment shown in the drawings. The invention also extends to any embodiments deviating from the embodiment shown in the drawings within the framework defined by the claims.

Figure 7:
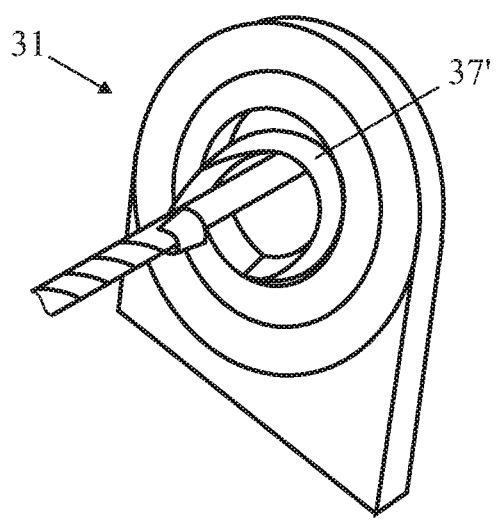
FIG. 7 shows the tape feed unit with an alternative embodiment of the tape guide.

For example, the helical tape guide may have a helical shape with a continuously increasing diameter seen along the axis. A tape feed unit 31 with a tape guide 37' which is curved along a 3-dimensional spiral shape is shown in FIG. 7 by way of illustration. Alternatively, the roll and/or the tape guide may stop and the tube may also make a rotary movement in addition to the translating movement, or the tube may stop and the roll, in addition to rotating, may be moved axially across the tube.

Due to the resilient action of the tape, fastening of the windings to each other is not always necessary; this depends on the resilient properties of the tape. The windings would not need at all to be fastened to each other or only the outermost winding or windings could be fastened.

The invention claimed is:

1. A tape application device for helical application a tape from a roll of superimposed tape windings on a tube, comprising a tube holder, a roll retainer and displacement means for rotating around an imaginary axis and translating in the direction of the imaginary axis the tube holder and roll retainer relative to each other such that the tape is taken from the inside of the roll and is helically wound on the outside of the tube, wherein the roll retainer only comprises support means which support the roll only on the outside.

2. A tape application device as claimed in claim 1, wherein the support means comprise suction cups.

3. A tape application device as claimed in claim 1, wherein the tape application device further includes guide means for guiding the tape from the inside of the roll to the outside of the tube.

4. A tape application device as claimed in claim 3, wherein the guide means comprise a resilient helical tape guide which, during operation, resiliently pushes with one end against the inside of the roll and with the other end is present close to the tube during operation.

5. A tape application device as claimed in claim 1, wherein the displacement means are such that they translate the tube holder only in axial direction relative to the roll retainer and the guide means, and in that these displacement means rotate the roll retainer and the guide means at different speeds in the same direction.

6. A tape application device as claimed in claim 1, wherein the tape application device further includes a fastening unit for fastening the tape to the tube, which fastening unit comprises a diverting roller which is parallel to and spaced apart from the tube and the tape of the tube and guides the tape back to the tube again, which fastening unit furthermore includes fasteners which are present between the tube and the diverting roller and between the tape parts running from the tube to the diverting roller and from there back to the tube, and which process the tube-oriented tape side, and which fasteners comprise rotation means for rotating the diverting roller together with the heating means around the tube.

7. A tape application device as claimed in claim 6, wherein the fasteners comprise heating means.

8. A tape application device as claimed in claim 6, wherein the fastening unit comprises a vacuum chamber in which the diverting roller and fasteners are present.

9. A tape application device as claimed in claim 6, wherein the tape application device comprises a further roll retainer, as well as further displacement means for rotating around an imaginary axis and translating in the direction of the imaginary axis the tube holder and further roll retainer relative to each other such that a further tape is taken from the inside of the further roll and is helically applied to the outside of the tube and/or on top of the tape already wound on the tube, and in that the fastening unit comprises a further diverting roller which is parallel to and spaced apart from the tube and guides the further tape from the tube and leads it back to the tube again, as well as further fasteners which are present between the tube and the further diverting roller, where the rotation means rotate the further diverting roller together with the further fasteners around the tube.

10. A tape application device as claimed in claim 1, wherein the tape application device further includes a winding unit which comprises a spreading mandrel on which the tape originating from a feed reel can be rolled up and which comprises said winding means for rotating the spreading mandrel.

11. A tape application device as claimed in claim 10, wherein the tape application device further includes further displacement means for displacing the winding unit to and from the roll retainer.

12. A tape application device as claimed in claim 10, wherein the winding unit further includes spot welding means for mutually connecting the tape windings.

* * * * *